(12) United States Patent
Wilcox

(10) Patent No.: US 7,836,633 B2
(45) Date of Patent: Nov. 23, 2010

(54) METHOD AND APPARATUS FOR ROBOTIC OCEAN FARMING FOR FOOD AND ENERGY

(75) Inventor: Brian H. Wilcox, La Canada, CA (US)

(73) Assignee: Brian and Cynthia Wilcox Trust, La Canada, CA (US), dated 26 November 2007

( * ) Notice: Subject to any disclaimer, the term of this patent is extended or adjusted under 35 U.S.C. 154(b) by 175 days.

(21) Appl. No.: 12/023,397

(22) Filed: Jan. 31, 2008

(65) Prior Publication Data

US 2009/0193715 A1 Aug. 6, 2009

(51) Int. Cl.
*A01G 31/00* (2006.01)
*A01G 9/08* (2006.01)
(52) U.S. Cl. ..................................... 47/59 R; 47/1.01 R
(58) Field of Classification Search ................. 47/59 R, 47/1.01 R, 66.7, 77, 78, 58.1 R; 114/253, 114/312, 255, 242; 43/3, 4, 9.2, 26.1, 9.1, 43/9.7
See application file for complete search history.

(56) References Cited

U.S. PATENT DOCUMENTS

| | | | |
|---|---|---|---|
| 3,324,815 A * | 6/1967 | Morales | 114/275 |
| 4,051,810 A | 10/1977 | Breit | |
| 4,133,141 A | 1/1979 | Lee | |
| 4,395,970 A | 8/1983 | Kunkle et al. | |
| 5,309,672 A | 5/1994 | Spencer et al. | |

(Continued)

FOREIGN PATENT DOCUMENTS

CA 2342379 9/2002

(Continued)

OTHER PUBLICATIONS

Howard Wilcox, The Ocean Food and Energy Farm Project, Nov. 30, 1975, Ocean Engineering Mechanics, vol. 1, 133-149.*

(Continued)

*Primary Examiner*—Peter M Poon
*Assistant Examiner*—Joshua Huson
(74) *Attorney, Agent, or Firm*—Felix L. Fischer

(57) ABSTRACT

A robotic ocean farm includes a plant support means such as a grid, with a submersible towing system incorporating means for navigation of the support grid in the open ocean, and means for positioning of the support grid in a first surfaced position for sunlight exposure of the plants and a second submerged position for nutrient gathering by the plants. The submersible towing system incorporates one or more tow boats connected to a forward periphery of the grid, each of the tow boats incorporating a propulsion system for navigation of the grid and maintaining lateral tension in the forward periphery of the grid. Additionally, one or more reaction boats are connected to an aft periphery of the grid. Each of the reaction boats incorporates a propulsion system for maintaining lateral tension in the aft periphery of the grid and reacting in concert with the tow boats to maintain longitudinal tension in the grid. A system for harvesting multiple independently operating farms incorporates a harvesting station which is placed or positions itself to meet the farms at predetermined locations during their voyage to harvest and replenish the plants carried on the farm grid. Base stations, separately or as a part of the harvesting station, communicate with the farms provide mutual support and informational exchange for optimized operation of the farms.

11 Claims, 6 Drawing Sheets

U.S. PATENT DOCUMENTS

| | | | |
|---|---|---|---|
| 5,673,645 A * | 10/1997 | Bandyopadhyay | 114/312 |
| 5,846,423 A | 12/1998 | Jensen | |
| 6,062,170 A | 5/2000 | Finch et al. | |
| 6,230,646 B1 | 5/2001 | Berry et al. | |
| 6,244,218 B1 | 6/2001 | McNeil | |
| 6,343,567 B1 | 2/2002 | McNeil et al. | |
| 6,539,894 B1 | 4/2003 | Byrne et al. | |
| 6,579,146 B1 | 6/2003 | Ganz | |
| 6,688,105 B1 * | 2/2004 | Shick | 60/641.1 |
| 6,884,143 B2 | 4/2005 | Ganz | |
| 6,892,672 B2 | 5/2005 | Klein | |
| 2002/0162515 A1 | 11/2002 | Boyd | |
| 2003/0062002 A1 | 4/2003 | Byrne et al. | |
| 2006/0150887 A1 | 7/2006 | Llang | |
| 2006/0162667 A1 | 7/2006 | Papadoyianis et al. | |

FOREIGN PATENT DOCUMENTS

| | | | |
|---|---|---|---|
| CA | 2342430 | | 9/2002 |
| CN | 1208552 A | | 2/1999 |
| JP | 03271092 A | | 12/1991 |
| JP | 07228293 A | | 8/1995 |
| NL | 8902656 A | * | 5/1990 |
| WO | WO 2006/030042 | * | 3/2006 |

OTHER PUBLICATIONS

North et al, Biomass Production by Freshwater and Marine Macrophytes, Jan. 29, 1981, American Chemical Society, p. 77-98.*

Expected Thermal Effects of a System of Large, Open-Ocean, Mariculture Facilities for Utilizing Solar Energy, Wilcox, Howard A., An Invited Paper Presented to a Meeting of the American Geophysical Union in San Francisco, Ca. Final Manuscript: Dec. 12, 1973.

The Ocean Food and Energy Farm Project, Wilcox, Howard A., Proceedings of the International Conference on Technology Assessment, Monaco, Oct. 26-30, 1975.

The Ocean Food and Energy Farm Project, Wilcox, Howard A. OED vol. 1 Ocean Engineering Mechanics, proceedings of the 1975 Winter Annual Meeting of The American Society of Mechanical Engineers, Houston, Texas, Nov. 30-Dec. 5, 1975.

Prospects and Problems in Regard to Farming the Open Oceans, Wilcox, Howard A., International Conference Alternative Energy and the Offer of the Sun and the Sea, Milan, Italy, Apr. 18-20, 1980.

* cited by examiner

METHOD AND APPARATUS FOR ROBOTIC OCEAN FARMING FOR FOOD AND ENERGY

BACKGROUND OF THE INVENTION

1. Field of the Invention

This invention relates generally to the field of biomass cultivation and more particularly to a system and method for cultivation of ocean vegetation on a movable support system with automated position and depth control.

2. Description of the Related Art

The world is relatively rapidly running out of oil. In the U.S., the discovery of new oil resources, and the rate of production, peaked many years ago. Roughly in parallel with the situation in the U.S., the peak of world production has lagged the peak in discovery by a few decades, and is expected to occur in the near future. This will be followed by a long period of decline as oil wells produce less and less even as they are given more and more elaborate "encouragement". Some say that production will peak in this decade; other say it will be a few more years before the peak is reached. Alternative sources of energy that can adequately replace the shortfall of oil in both price and production volume are not apparent. This problem is huge—currently the world consumes energy at the rate of about $1.3 \times 10^{13}$ Watts, which is ~2 kW continuously for every person on Earth. In the U.S., per capita consumption is closer to 10 kW. At $100 per barrel of oil, the raw cost of energy is about 6 cents per kilowatt-hour (in the form of heat, not electricity). At $3.50 per gallon of gasoline, the cost is almost 10 cents per thermal kWh. The largest fraction of the energy used by civilization comes from oil, at a dollar value of several trillion dollars per year. Oil production is presumed to decline over the next century roughly as a mirror-image of the way it has grown over the past century. Even without addressing the huge problem of greenhouse gasses, the nation and the world need to provide an alternative energy source to replace the oil resource that is fast being consumed.

Solar energy falls on the Earth in an abundant, if diffuse, way. The power of sunlight arriving continuously at the Earth's surface is about $10^{17}$ Watts—almost 10,000 times the rate that power is used by all of humanity. Perhaps most importantly, this power can be collected and used in a way that does not upset either the thermal balance of the Earth (since it falls here naturally anyway) or the balance of gasses in the atmosphere (since using it does not intrinsically involve the net release of gasses that change the absorption or emission properties of the atmosphere).

The key problem of solar energy is that it is so diffuse: it provides only about 1000 W/m² at peak brightness and ~160 W/m² at any typical point on the Earth's surface averaged over the entire year. At 6 cents per kWh (the thermal equivalent to oil at $100/barrel), this means that each square meter of solar collector only generates about $86 in energy value per year, even if converted at 100% efficiency. The conversion efficiency for solar power to electricity currently ranges downward from about 30%, so that each square meter of solar collector generates perhaps $25 in gross economic return per square meter per year (although electricity generally sells for several times the price of thermal energy). This price of energy is too low for any "high tech" solution to be viable, since a traditional economic rule-of-thumb is that the capital investment can be no greater than three years gross sales, and hopefully less. Currently photovoltaic solar arrays, for example, have a capital cost that is many times the value of the power that they can generate in a year. For example, at a typical photovoltaic array cost of $3 per peak Watt and operating for 1400 peak-equivalent hours per year, the time to return the capital cost of the array if the electricity were sold at 10 cents per kWh is 22 years. Any basic energy source, which is offered to replace oil and not cause an upheaval in the world economy, must have a price close to or below 6 cents per kWh of thermal energy, or 10-15 cents per kWh of electrical energy.

In the early 1970s a solution to this overall problem was suggested by Dr. Howard A. Wilcox of the U.S. Naval Ocean Systems Center. (Dr. Wilcox, deceased in 1994, was the father of the inventor in the present application.) This solution was to use ocean farming to provide relatively inexpensive energy (and food) for the world's populations. Working with Professor Wheeler North of Caltech and with funding from the U.S. Navy, the National Science Foundation, the American Gas Association, and others, he deployed a small test farm that showed that fast-growing marine plants (especially *Macrocystis Pyrifera*, the "California Giant Kelp") can convert over 1% of the incident sunlight into useful stored chemical energy. He envisioned using nutrients from the deep ocean. Most of the ocean is a photosynthetic "desert" because the surface waters are so nutrient-poor—in places where upwelling from deeper layers is natural, such as the Sargasso Sea, there is abundant photosynthetic activity. Dr. Wilcox proposed large farms—typically 100,000 acres—that each would consist of a huge "net" with a grid spacing of several meters to which all the plants would be affixed. Dr. Wilcox demonstrated that the cost of this substrate would be much too expensive if the farm were anchored to the bottom and had to withstand the forces of currents, waves, and storms. Instead, he envisioned farms that floated freely and used a propulsion system to give fine control to keep them circulating around in the large eddy patterns in the oceans.

While Dr. Wilcox showed that such farms could be economical if made large enough, he cautioned (see "*Hothouse Earth*", Wilcox, Howard A., Praeger 1975) that the fundamental problem remained that Organization of Petroleum Exporting Countries (OPEC) oil producers could and did systematically drive any new alternative energy sources out of the market through their total control of the price of energy. Since the production cost of a barrel of oil for some countries at that time was approximately $0.25, and it was selling for $20 or more, the OPEC countries (especially Saudi Arabia) could manipulate the price of energy so that any investment in alternative sources of energy could be systematically undermined or obliterated. Dr. Wilcox noted that any fledgling alternative energy sources must be protected by government edict if they were to thrive. The particular advantages of ocean farming are that the surface area in the ocean is "free", that the necessary nutrients required to nurture the plants lie only a few hundred meters below the sunlit surface waters, that the biomass generated makes an almost ideal feedstock into both of the existing food and energy distribution networks, and that the growth of these plants results in no net production of greenhouse gasses or thermal pollution. The use of this biomass as food is attractive because dried kelp can be fed directly to farm animals, replacing feedstocks that currently sell for much more than oil. Kelp can be composted directly into natural gas at extremely high efficiency in only a few weeks, and the resulting natural gas can be injected into the distribution grid or can be readily converted into gasoline, jet fuel, or other common petrochemical commodities.

A major problem with the huge kelp farms envisioned by Dr. Wilcox is the very large capital cost of the system. In order to produce a net return, the farms envisioned by Dr. Wilcox would have to be extremely large. This is due to the more-or-less fixed minimum size of any large upwelling apparatus that brings up nutrient-rich water from depth (typically 300 m deep), and the scaling laws that govern the design of the large "propulsors" (diesel or wave-powered propellers) that keep the farm from running aground. Dr. Wilcox conjectured that the overall efficiency of the farm might be increased from the 1% that he and Dr. North had demonstrated to about 2%, at which point the large farms he envisioned would be economical. Another major problem with these farms is that the upwelling of large amounts of cold, deep water will change the surface temperature of the oceans and change the rates that water vapor or other gasses exchange between the surface waters and the atmosphere. The effect of these changes on the global climate are unknown, but are possibly large given the tremendous area of the farms needed if there is to be a significant effect on the global production of food and energy.

It is therefore desirable to provide a system for ocean biomass production that is economical even at relatively small scale and at the demonstrated 1% efficient conversion of sunlight to stored chemical energy, and without requiring upwelling of significant amounts of deep water to the ocean surface in ways that might have unforeseen impacts on the Earth's climate.

SUMMARY OF THE INVENTION

The present invention provides a robotic ocean farm including a plant support grid with a submersible towing system having means for navigation of the support grid in the open ocean, and means for positioning of the support grid in a first surfaced position for sunlight exposure of the plants and a second submerged position for nutrient gathering by the plants.

In a first embodiment of the invention the submersible towing system incorporates two tow boats connected to opposite extents of a forward periphery of the grid, each of the tow boats incorporating a propulsion system for navigation of the grid and maintaining lateral tension in the forward periphery of the grid. Additionally, reaction boats are connected to opposite extents of an aft periphery of the grid. Each of the reaction boats incorporates a propulsion system for maintaining lateral tension in the aft periphery of the grid and reacting in concert with the tow boats to maintain longitudinal tension in the grid.

A system for harvesting multiple independently-operating farms incorporates a harvesting station which is placed or positions itself to meet the farms at predetermined locations during their voyage to harvest and replenish the plants carried on the farm grid. Base stations, separately or as a part of the harvesting station, communicate with the farms to provide mutual support and informational exchange for optimized operation of the farms.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
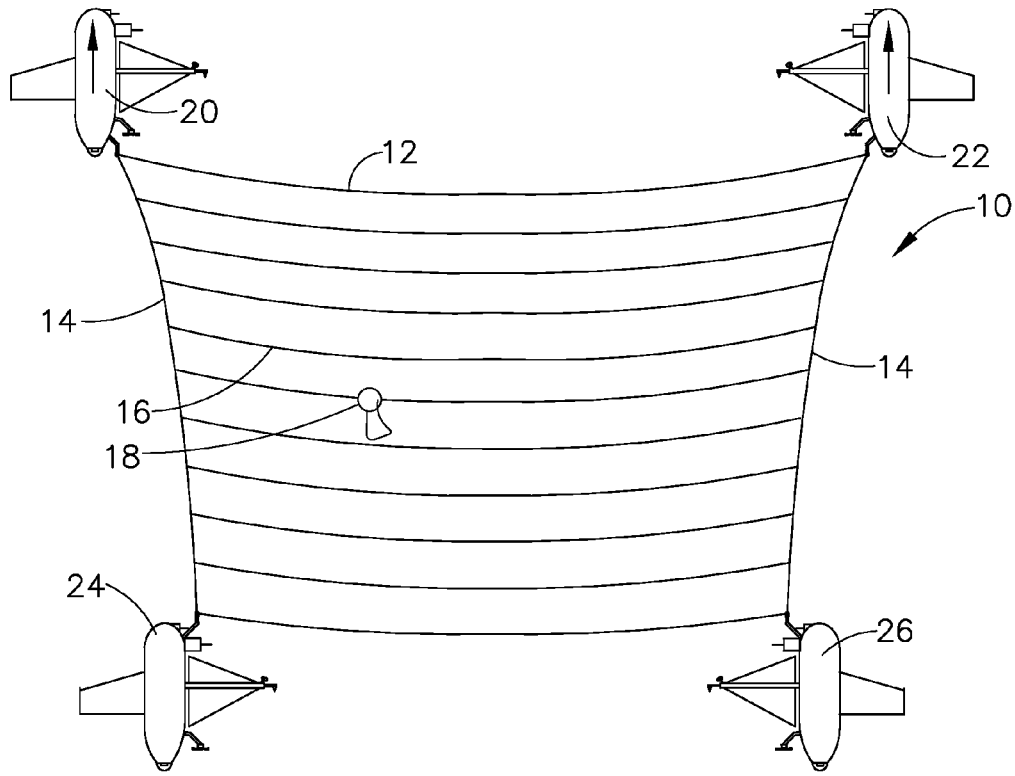
FIG. 1 is a schematic view of the elements of a submersible farm according to the present invention.

Referring to the drawings, FIG. 1 shows a farm 10 according to the present invention. A strong neutral-buoyancy rope 12 with two similar ropes 14 trailing back with additional (perhaps smaller diameter, but also neutral buoyancy) ropes 16 stretched between them create a support grid. In alternative embodiments, the support grid may be created using wire or rope supported by buoys at spaced intervals to provide a substantially neutrally buoyant grid. Marine plants 18 are anchored to the grid created by the rope mesh at periodic intervals (about 1 meter spacing along the ropes for California Giant Kelp with 10 meter down current spacing to accommodate the plants at harvestable size). In alternative embodiments, the support grid may be created using wire or other high strength filaments supported by buoys at spaced intervals to provide a substantially neutrally buoyant grid. The grid is propelled by a submersible towing system. Two towing boats 20 and 22, robotic "sailboats" in a first embodiment of the invention, provide a first element of the towing system. Two reaction boats 24 and 26 provide a second element of the towing system to create and maintain tension in the lines by relative positioning with respect to the two tow boats. In one alternative embodiment, a single tow boat and single reaction boat are employed with a semi-rigid grid. Combinations of various numbers and configurations of submersible tow and reaction boats to achieve necessary control and navigation of the grid are employed in additional alternative embodiments. Also, an array of weights and hose-fed bladders distributed throughout the farm grid could provide for changes in buoyancy.

As will be described in greater detail subsequently, the tow boats and reaction boats are submersibles with controlled ballast capability to position the grid at desired depths. Marine plants can grow effectively without simultaneous application of nutrients and sunlight. Experiments by Wheeler North of Caltech demonstrated that plants can be bathed in nutrient-rich water at night, and exposed to sunlight in the day (surrounded only by nutrient-poor water) and they grow as well as if both were available simultaneously. Like most biological organisms, marine plants gather and store nutrients whenever they are exposed to them, so that there is at least a modest storehouse built up for whenever an energy-source becomes available to metabolize them.

Figure 2:
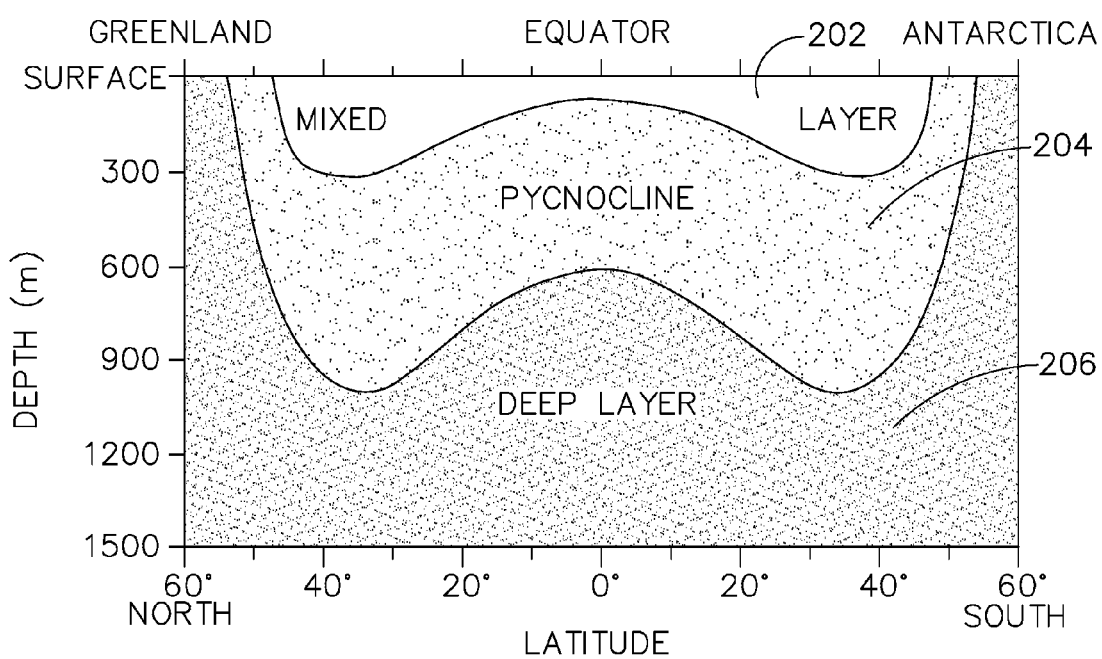
FIG. 2 is a graph of ocean layers.

For the initial exemplary embodiment, the tow boats and reaction boats employ "sailboat" propulsion using fluid layers in relative motion. The most obvious of these layers is the air/water interface, where any local shear between the two fluids has been used for propulsion by sailboats for millennia. However, there are also different layers in the oceans whose relative motion can be used for propulsion. FIG. 2 shows the typical arrangement of these layers at different latitudes. The top layer 202, the "mixed layer" is nutrient-poor and also warmer and less saline than the deeper layers. The pycnocline layer 204 is adjacent to the mixed layer and the deep layer 206 resides beneath the pycnocline layer. Additional local layers, like local microclimates in the atmosphere, exist and may be employed for the relative shear motion required when available. In most cases, the boundary between these layers will be relatively sharp—distinguished by a thermal and/or salinity gradient that makes a nearly step-wise transition typically less than a few meters thick.

Figure 3:
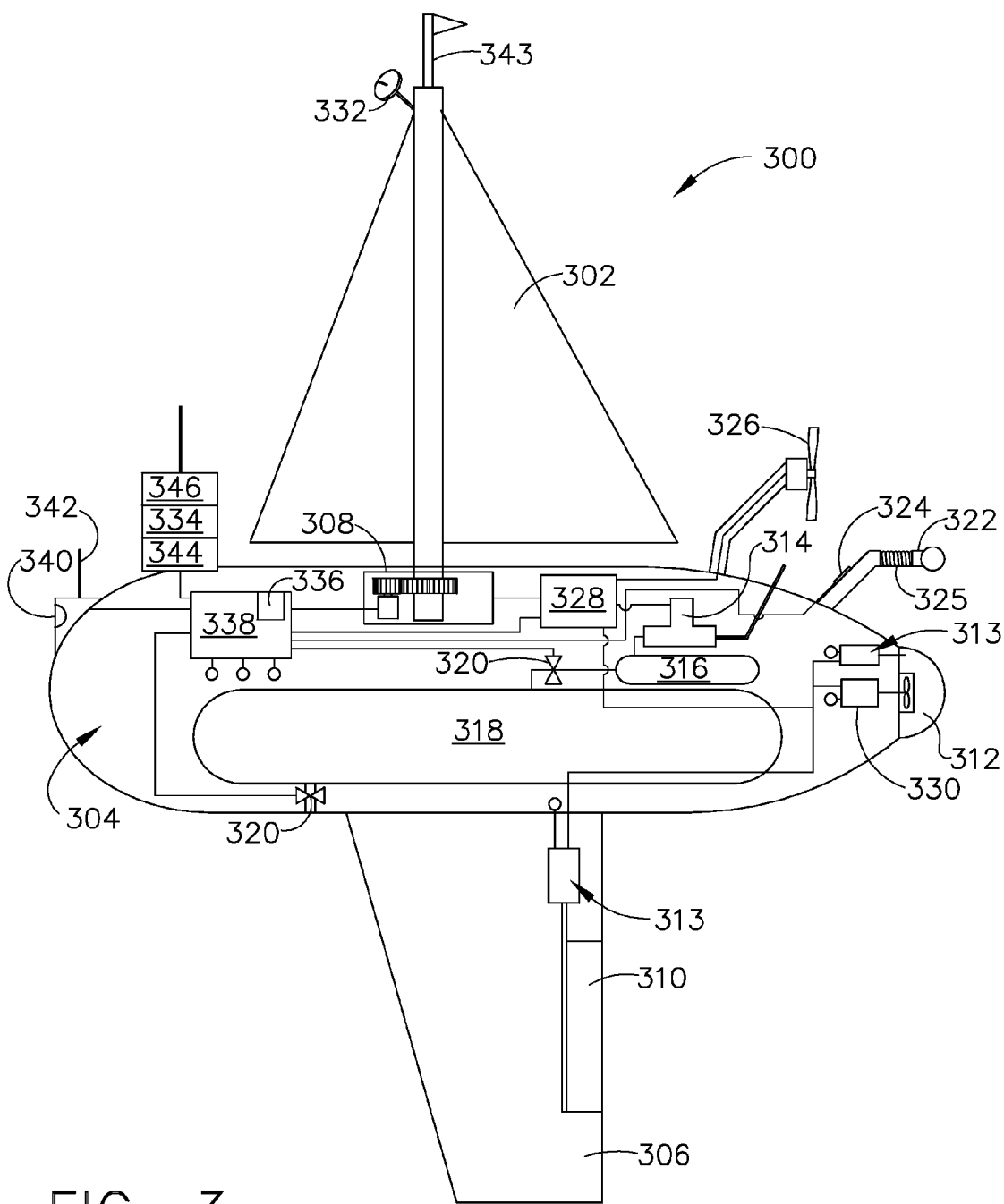
FIG. 3 is a block diagram of the elements of a first embodiment of the submersible tow and reaction boats in the farm system.

FIG. 3 demonstrates a basic configuration for the tow boats and reaction boats in the first embodiment. Each boat 300 employs a mast and sail 302 (integrated into a single rigid or semi-rigid assembly for the embodiment shown) that extends above the hull 304 to act as a wing to intercept an upper layer such as the atmospheric wind above the ocean surface, and generate a lateral force (aerodynamic "lift", except that the "wing" is vertical so the "lift" is in the horizontal plane). A keel 306 depends from the hull into the water with the hull at the surface or into a lower layer when submerged, which acts as another wing to intercept the water layer and generate a different sideways "lift" vector. A motorized gear set 308 connecting the sail to the keel or individual gear sets attached to each, changes the angle between the sail and the keel so that normal "sailing-type" navigation is possible by managing the lift vectors from the sail and the keel to allow motion in any given direction (including "tacking", as a sailboat does, if the desired motion is "into the wind"). In alternative embodiments one or more additional control surfaces 310 are provided that, for example, allow the keel to react to the tipping moment of the sail, keeping the sail more vertical than it would be on a normal sailboat. Standard rudder controls 312 are provided for directional control. Computer controlled servos 313 are provided for operation of the control surfaces.

For submersible operation, each boat has a buoyancy control system such as a wave-powered air compressor 314, tank 316, and buoyancy-control chambers 318 with computer-controlled valves 320, allowing them to "dive", submerging the entire farm as deep as is necessary to reach ocean layers carrying nutrients, or to avoid storms or approaching ships or other hazards.

Each boat incorporates as a portion of its attachment system 322 to the rope grid load cells (e.g. strain gages) 324 for sensing tension in the farm shroud lines so that the tension can be managed by maneuvering of the robotic sailboats. Passive tension control (e.g. springs and shock absorbers) 325 are included as part of the attachment and tension sensing systems to prevent momentary overloads (e.g due to wave action). Release mechanisms allow the grid to be released from the boats if it becomes snagged, so that the capital investment in the boats (which is much larger than that in the grid) can be saved.

Each boat incorporates a power generator 326 for producing and storing energy (such as a small solar panel or wind turbine near the top of the mast, or wave-powered generator in the water). The power generator is used directly or through energy storage (e.g a battery) 328 to operate navigation and control electronics as needed and also to provide temporary propulsion through motor 330 to keep the lines taught when no fluid shear forces are available. The navigation electronics in the exemplary embodiment include a GPS antenna 332 on the top of the mast/sail and a magnetic compass (e.g. 3-axis flux sensor) 334 for sensing of the Earth's magnetic field vector while underwater. A clock 336 is included in the control electronics with associated programming in a control computer 338 to predict sunlit periods, arrange communications sessions with an overall farm control system, plan trajectories to the scheduled harvesting appointments, etc. The control computer additionally controls the valving for ballast tank control, sail, keel and rudder controls to maintain the tension on the grid, for point-to-point navigation, to prevent collisions, etc.

Detection systems 340 such as acoustic sensing, radar detection, and/or remotely sensed advisories from a control center are employed for detecting storms and approaching ships. Environmental measurement sensors 342 such as temperature, salinity, and/or density sensors are provided for detecting layer boundaries under the water. Flow direction sensor 343 for wind or relative water directional flow is employed for navigation calculations by the computer for sail settings.

Local communications links 344 such as acoustic communications or wires or fiber-optics embedded in the primary tension cables are provided for communicating with the other robot boats at the corners of the farm. Long range communications links 346 such as satellite phone or low-frequency radio that bounces off the ionosphere are provided for communicating with one or more control centers, occasionally receiving commands and/or transmitting status information. Medium range communications links such as acoustic or radio communications or both are provided for communicating with other, similar farms, to prevent collisions and entanglements.

Figure 4:
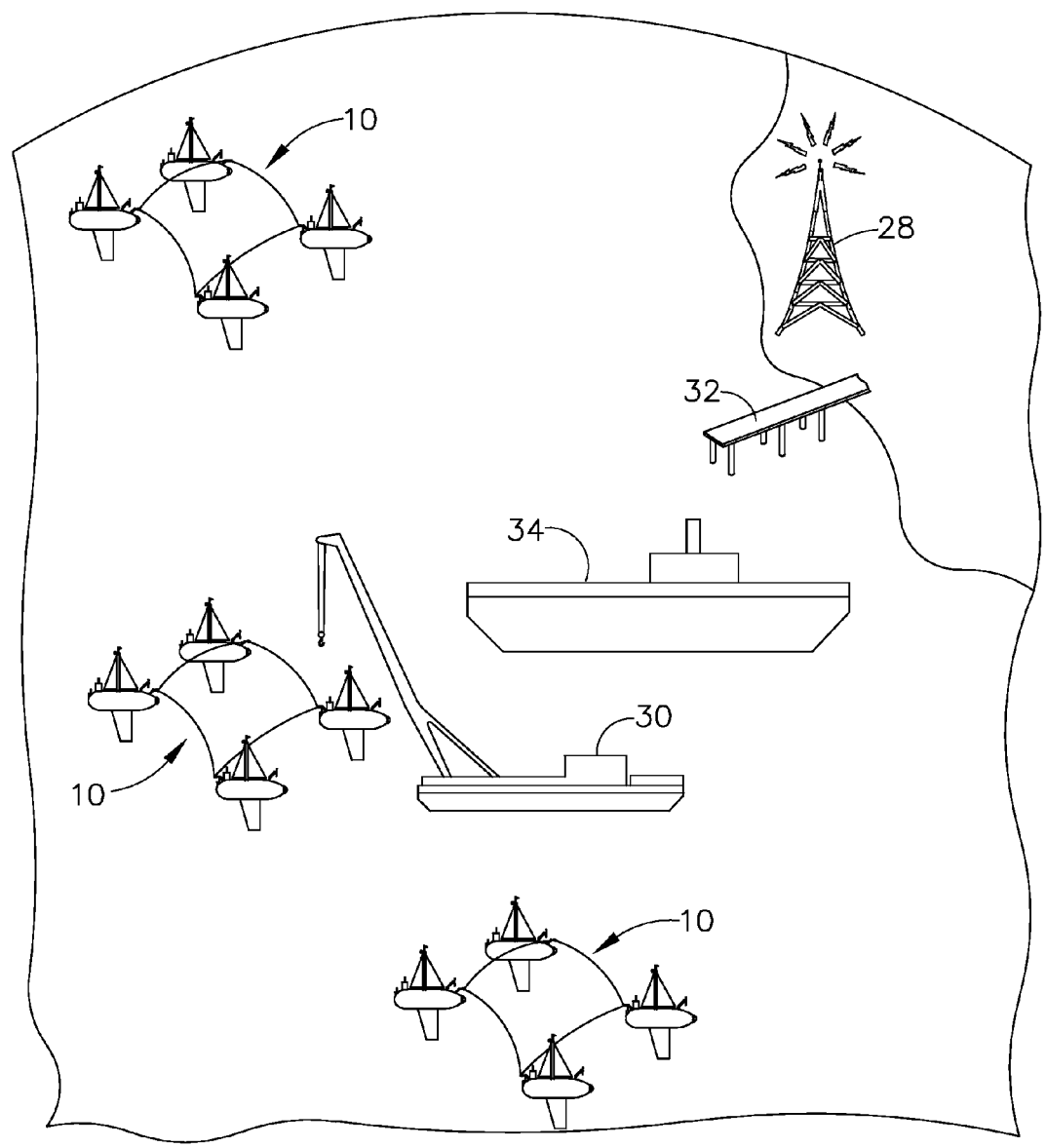
FIG. 4 is a block diagram of the elements of the system elements for harvesting and support.

The overall system envisioned for the present invention is shown in FIG. 4 and includes the individual farms 10 collectively operating with respect to a control and harvesting/replenishing system that would include one or more communications and control stations 28 and one or more harvesting stations 30 which in the embodiment shown would be similar to processing ships used in large fishing fleets. The harvesting stations would remain at or travel to centralized locations where the individual farms would collect at predetermined time intervals. The predetermined courses of the farms are anticipated to result in circuits running out from and returning to the harvesting station(s). The navigational planning for the circuits will include assisting ocean current data and will be recalculated during the voyages by the control systems on the individual farms and/or input from the centralized control stations. The plants affixed to the rope grids would be harvested with the bio-matter obtained transferred to the harvesting station for processing and/or transport. If harvesting methods are employed which do not compromise the attachment and body of the plants on the grid, the farm returns to its predetermined sailing station for the next growth cycle. If harvesting results in complete removal of the mature plants from the grid, the harvesting station "replants" the farm by attachment of immature plant "seedlings" to the grid. The farm then commences its voyage to create new plant growth.

The harvesting station is then either sailed to an off-loading port 32 or specific transportation ships 34 off-load the bio-mass from the harvesting station for transport to the off-loading port. The generated bio-mass is then available for processing as energy feedstock or food stuffs.

Figure 5:
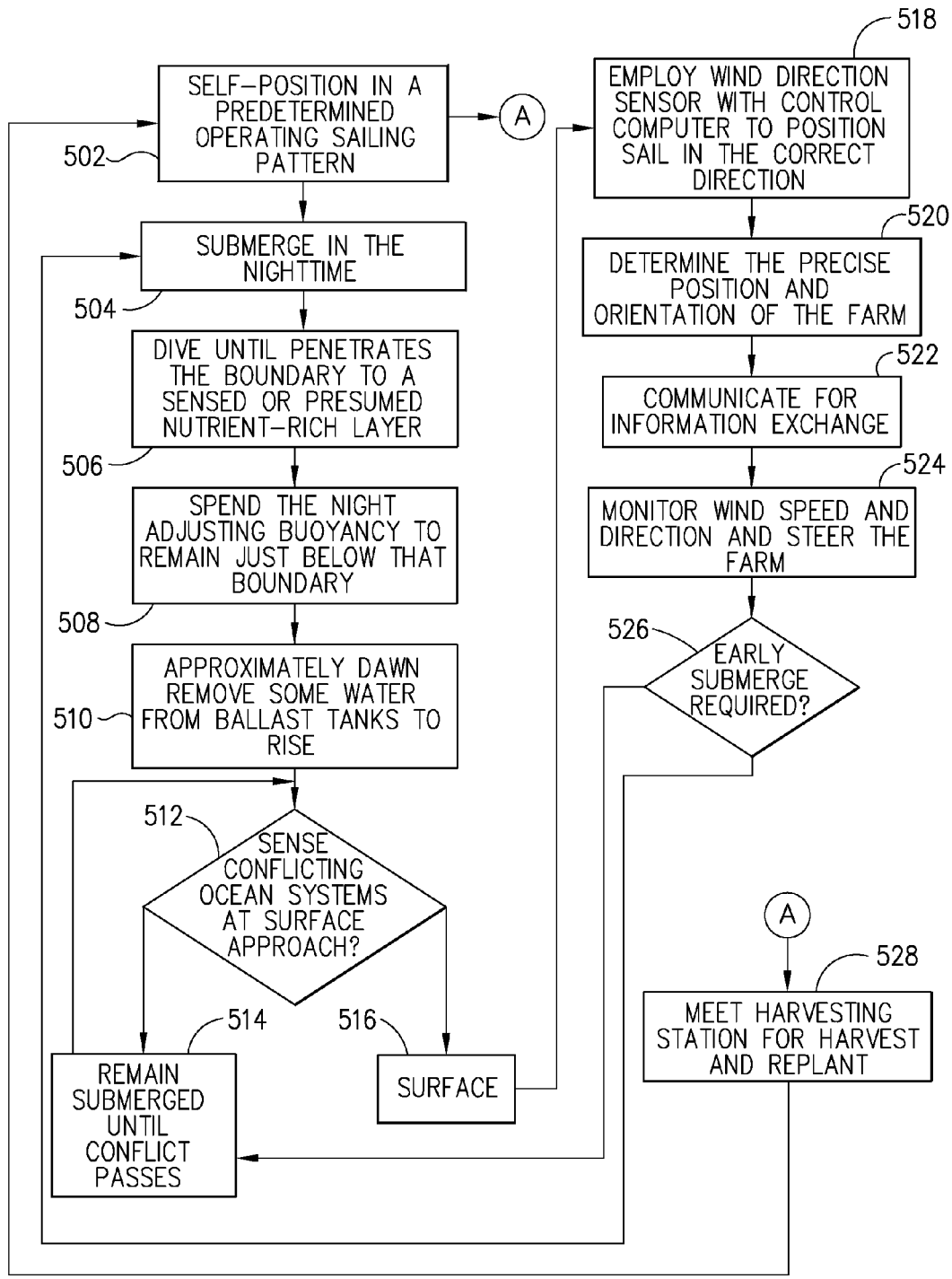
FIG. 5 is a flow chart of the operation of the farm elements of the system.

FIG. 5 provides a flowchart of the operation the farm elements of the system defined by the disclosed embodiment. Each farm would self-position in a predetermined operating sailing pattern 502. In most cases, the sailing pattern follows the large-scale open-ocean circulation patterns to obtain assistance from the naturally occurring currents to facilitate their voyage. The farms then submerge in the night-time by allowing water to enter ballast tanks of each boat 504 to make the whole system slightly negatively-buoyant. If the farm is so equipped, ballast tanks in distributed buoys would also be made negatively buoyant. It would dive until it sensed (e.g. by temperature, salinity, or water density measurements) that it had penetrated the boundary to a presumed nutrient-rich layer 506. It would spend the night adjusting buoyancy to remain just below that boundary 508 allowing the plants engaged to the farm support structure to infuse the nutrients. Navigation while submerged may be accomplished by depth control to allow precise placement of the boat hull and, primarily, the keel in one layer with the mast and sail assembly rising into the adjoining layer. The relative motion and shear created by the layers provides propulsive force for maintaining position of the tow and reaction boats for grid tensioning as well as directional motion of the farm as a whole to replace or supplement the temporary propulsion motors previously described. At approximately dawn (based on its clock and knowledge of its approximate longitude) using stored energy (e.g. by compressed air or batteries) the boats remove some of the water from the ballast tanks to rise 510. Again, if so equipped, distributed buoys would be made positively buoyant by the same approach.

As the farm approaches the surface it senses (e.g. by acoustic sensing) the possibility of conflicting ocean systems 512 that could damage the farm such as approaching ships, and stay submerged 514 at a safe depth until the conflicting target passes. By comparing the phase of arrival of acoustic data between the robotic boats at the corners of the farm, accurate directional information can be obtained. If an approaching ship stays at constant heading, it is on a collision course. Similar acoustic sensing, and wave height sensing, can be used to check if there is a raging storm at the surface, which could damage the sails or other equipment. Also, central farm control station 28 as shown in FIG. 4 can warn farms of forecast storms a few days in advance so they know to remain submerged. Assuming there are no approaching ships and the estimated winds are acceptable, the farm will surface at about sunrise 516. The tip of the sails will first penetrate the surface, exposing the GPS receiving antennas, wind velocity and direction sensors, and communication antennas. If the measured wind speed is significantly greater than the acoustically-estimated speed, and is at an unsafe level, the robot boats can submerge again without exposing the full sail to the wind. If the wind speed and wave height are safe, then the ballast tanks can be exhausted more fully to expose the entire sail to the wind. The wind direction sensor is employed by the control computer to activate the gear drive to point the sail in the correct direction 518 as it comes out of the water, to ensure that no excessive forces are put on the sail, the keel, or the tension lines. The GPS sensors on the boats will determine the precise position and orientation of the farm 520. The communications antennas will allow information to be exchanged 522 with the farm control center, including but not limited to transmission of the status and location of the farm, logged water column sensor data, and images from the mast-heads of the farm (if bandwidth permits), and reception of updated weather forecasts, ocean current forecasts, expected movements of large ships in the area, updates on the harvest rendezvous time and location, etc. Throughout the day the boats will monitor wind speed and direction to steer the farm 524 (by changing the angle between the sail and the keel) so as to stay in the desired ocean circulation and to reach the harvesting point at the desired time. The robots will also take sensor data (including acoustic and perhaps also with a radar receiver) to sense approaching ships, so that evasive submersion 526 can be performed. If the wind speeds or wave heights rise to dangerous levels, the farm will also submerge. In any event, at the end of the day, the farm will submerge, and the process will repeat. The expected rate of ascent or descent will be approximately 0.1 m/s, so to submerge or rise 300 meters will take about 1 hour. At the end of the predetermined voyage pattern the farm will meet or travel to the harvesting station 528.

As exemplary of an embodiment as disclosed therein, the entire farm needs to maneuver at right angles to the prevailing current at perhaps 0.1 m/s (0.2 knots) to be able to stay in the major circulation eddies of the ocean, and to navigate to the harvesting points. For this system a drag coefficient of 2.0, a density of water of 1026 kg/m$^3$ (seawater), and a typical speed of 0.1 m/s (0.2 knots) is assumed. Assuming the farm can be approximated as a square with the length of each side being S, it has area S$^2$. If each plant covers 10 m$^2$, then for a farm with P plants we have 10 P=S$^2$, or S=3.2 P$^{1/2}$ meters. So the farm is 3.2 P$^{1/2}$ wide (in meters) by about 1 meter deep (e.g floating the grid at or near the surface while sunlight is being absorbed). The frontal area is 3.2 P$^{1/2}$ m$^2$ so the drag force on the farm is approximated by F=½ρV$^2$AC$_D$=(0.5)(1026)(0.1$^2$)(3.2 P$^{1/2}$)(2)≈32.8 P$^{1/2}$ Newtons.

The typical wind speed over the open ocean is about 8 m/s (16 knots). A wing of length L deflects an airstream of effective cross-section of about L$^2$/2. So with the density ρ of air at sea level of 1.29 kg/m$^3$, the force generated by a wing will be some small multiple of F=½ρV$^2$(L$^2$/2)≈20 L$^2$, where L is in meters and F is in Newtons. So if pulling P plants at an average speed of 0.2 knots takes 32.8 P$^{1/2}$ Newtons, that requires two sails of height L≈0.91 P$^{1/4}$. Consequently, the needed sail height grows roughly with the fourth-root of the number of plants in the farm. Since the cost of a mast and sail grows at most with the cube of the height (scaling all dimensions uniformly and assuming cost is proportional to mass), this favors large farms. Tow boats equipped with a 5-m mast and sail might cost a few thousand dollars (based on commercial sailboat supplier data), and would support a farm with about 930 plants converting sunlight at 1% efficiency to generate a gross revenue of $7,800 per year in energy value (or much more if sold as food or livestock feed). A 10-m mast and sail might cost a little over $10,000, and support a farm with over 14,600 plants generating a gross revenue of $123,000 per year in energy value.

The buoyancy force in Newtons required to move the farm vertically at 0.1 m/s will be larger than that required to tow it horizontally at that same speed, since the farm projects a larger area than its frontal area during diving and surfacing operations. If we assume the drag of the plants dominates and that each plant projects an area of 1 m$^2$ in the direction of vertical motion, then the area of the entire farm is P, so the drag force F=½ρV$^2$AC$_D$=(0.5)(1026)(0.1$^2$)(P)(2)≈10.3 P Newtons. For a farm with 930 plants (5 meter masts on the ships) this requires a ballast tank of volume ±0.24 m$^3$ on each of the four corner boats to give the necessary change in buoyancy. Since the volume of the ballast tanks grows linearly with an increasing number of plants, but the size of the boats grows rather slowly with the number of plants, there is an optimum point where the ballast tank occupies a convenient fraction of the volume of the boats. Farms with more plants than the optimal number will require boats with out-sized hulls (compared to their sail size) to accommodate the needed large ballast tanks.

Figure 6:
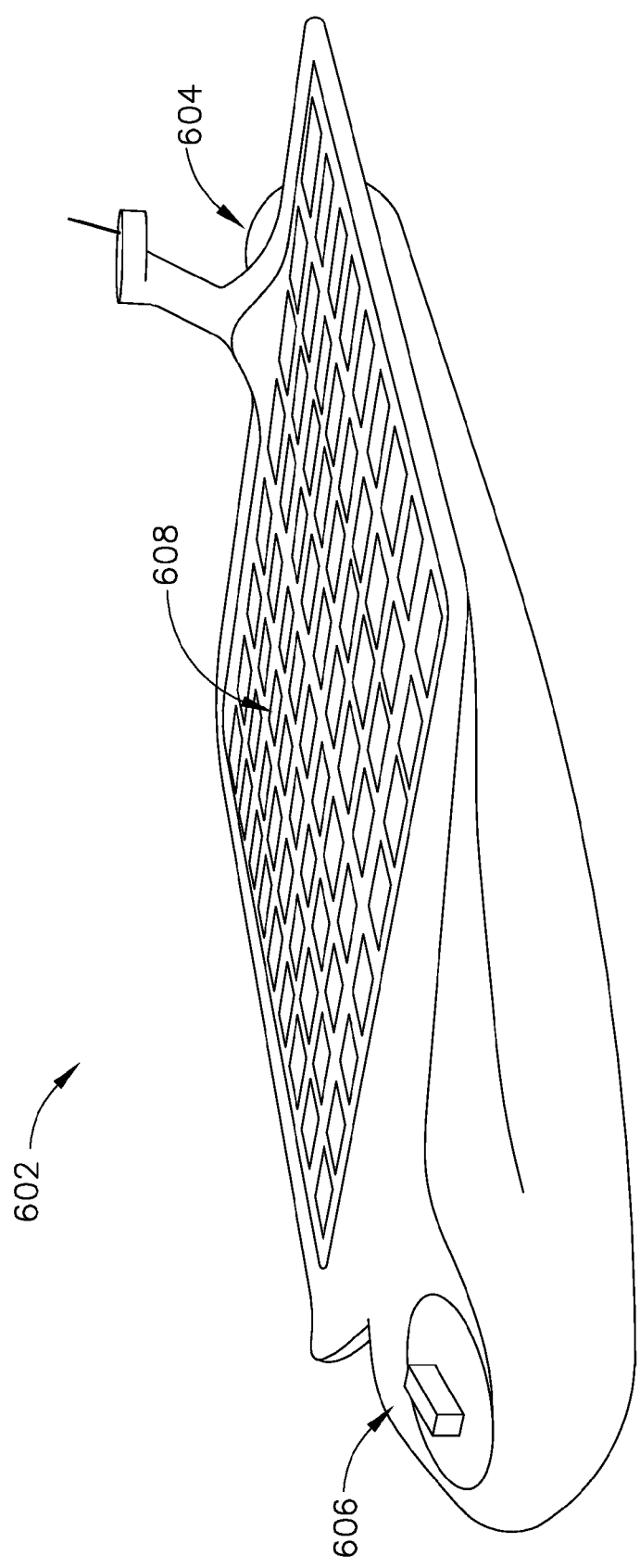
FIG. 6 is a pictorial representation of a second embodiment of the tow and reaction boats for use with a system embodying the invention.

FIG. 6 shows an alternative configuration for the tow and reaction boats in the farm system. The boat 602 operates using conventional propeller or jet drive impulsion 604 electrically driven by a battery storage system 606. A solar array 608 is present on the upper deck of the boat providing sufficient electrical power generation capability for energy storage requirements for the propulsion and overall system. To produce a force of 32.8 P$^{1/2}$ Newtons (as derived in Para 32) on the grid corners using four propellers each having 1 m² of effective cross-section would require that each propeller produce a jet of velocity $V=(32.8/(4*1026))^{1/2} P^{1/4} \approx 0.09 P^{1/4}$. For a farm with 930 plants, this implies a jet velocity of about 0.5 m/s. The power in each jet (converting at 100% efficiency) is about 62 W. Larger propellers will require less power to produce a given level of thrust, just as the large propellers of a tugboat are sufficient to slowly move huge ships at modest power. Assuming that the configuration shown in FIG. 6 must produce this thrust continuously, using solar power that is only available (say) $\frac{1}{3}^{rd}$ of the time, then the solar array would need to have a peak power output of at least 200 W and the batteries would need to have a capacity of about 2000 Wh (all for a farm having 930 plants). A solar array with 200 W output would have an area of about 1-3 m², and the batteries would have a mass of about 20-100 kg, based on the performance range of currently available commercial technologies of various costs.

In other alternative embodiments, wind-or-wave powered boats using a wind turbine or wave generator to power a subsurface propeller, as opposed to a sailboat or a solar powered propeller, to provide the tow and reaction boats.

Figure 7:
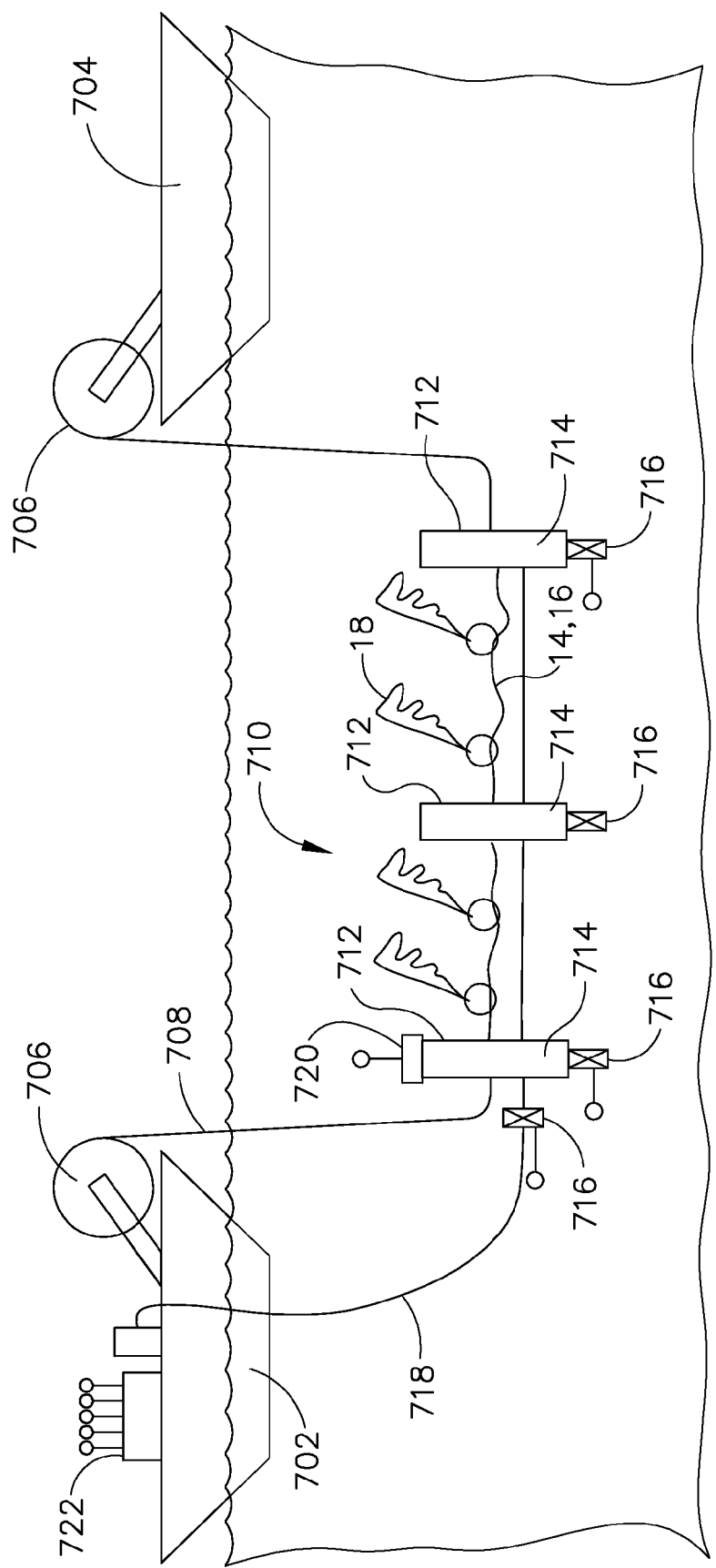
FIG. 7 is a pictorial representation of a third embodiment of the tow and reaction boats having a controlled submersion system on the plant support grid with associated extendible supports from the boats.

Use of a towing system in which the tow and reaction boats are submersible with the plant support grid provides for weather and traffic avoidance. However, an alternative embodiment of the invention provides for a controlled submersion system on the plant support grid with associated extendible supports from the boats. An example of this embodiment is shown in FIG. 7. The tow boat 702 and reaction boat 704 each employ a winch 706 and cable 708 which are attached to the plant support grid 710. Buoys 712 incorporate ballast tanks 714 to maintain the desired buoyancy of the support grid for submerging to the nutrient rich layers. Computer controlled valves 716 for flooding the ballast tanks to submerge and compressed air lines 718 from a pressurization source on one or more of the boats provide for expelling water from the ballast tanks to surface. Sensors 720 on the grid provide communications of layer composition to computer 722 for ballast control.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A robotic ocean farm comprising:
   a continuously free-floating plant support means;
   a submersible towing system having
      propulsion and navigation and control electronics to tow the plant support means in the open ocean on a predetermined route from and returning to a harvesting location, and
      a buoyancy system for repeatedly submerging and surfacing the plant support means with a first surfaced position for sunlight exposure of plants attached to the plant support means and a second submerged position at a depth for a nutrient rich layer above the bottom for nutrient gathering by the plants.

2. A robotic ocean farm as defined in claim 1 wherein the submersible towing system comprises;
   at least one tow boat connected to a forward periphery of the support means, the at least one tow boat incorporating a propulsion system for towing of the support means and maintaining lateral tension in the forward periphery of the support means; and
   at least one reaction boat connected to an aft periphery of the support means, the at least one reaction boat incorporating a propulsion system for maintaining lateral tension in the aft periphery of the support means and reacting in concert with the at least one tow boat to maintain longitudinal tension in the support means.

3. A robotic ocean farm as defined in claim 2 wherein the at least one tow boat incorporates a sail and keel with an adjustable angle therebetween for aerodynamic and hydrodynamic shear force resolution for propulsive thrust.

4. A robotic ocean farm as defined in claim 2 wherein the at least one reaction boat incorporates a sail and keel with an adjustable angle therebetween for aerodynamic and hydrodynamic shear force resolution for propulsive thrust.

5. A robotic ocean farm as defined in claim 2 wherein the at least one tow boat and the at least one reaction boat each incorporate local communication links with the other boats.

6. A robotic ocean farm as defined in claim 1 wherein the submersible towing means includes ballast tanks for submersion of the support means.

7. A robotic ocean farming system comprising:
   at least one continuously free-floating plant support grid;
   a submersible towing system having
      propulsion and navigation and control electronics to tow the at least one support grid in the open ocean in a predetermined route, a buoyancy system for repeatedly submerging and surfacing of the at least one support grid in a first surfaced position for sunlight exposure of the plants and a second submerged position at a depth for a nutrient rich layer above the bottom for nutrient gathering by the plants;
   a harvesting station positionable at a predetermined point for interacting with the plant grid.

8. A robotic ocean farming system as defined in claim 7 wherein the submersible towing system comprises:
   at least two tow boats connected to opposite extents of a forward periphery of the grid, each of the tow boats incorporating a propulsion system for towing of the grid and maintaining lateral tension in the forward periphery of the grid; and
   at least two reaction boats connected to opposite extents of an aft periphery of the grid, each of the reaction boats incorporating a propulsion system for maintaining lateral tension in the aft periphery of the grid and reacting in concert with the tow boats to maintain longitudinal tension in the grid.

9. A robotic ocean farming system as defined in claim 8 wherein each of the tow boats incorporates a sail and keel with an adjustable angle therebetween for aerodynamic and hydrodynamic shear force resolution for propulsive thrust.

10. A robotic ocean farming system as defined in claim 8 wherein each of the reaction boats incorporates a sail and keel with an adjustable angle therebetween for aerodynamic and hydrodynamic shear force resolution for propulsive thrust.

11. A robotic ocean farming system comprising:
   a continuously free-floating plant support grid;
   at least two tow boats connected to opposite extents of a forward periphery of the grid, each of the tow boats incorporating a sail and keel with an adjustable angle therebetween for aerodynamic and hydrodynamic shear force resolution for propulsive thrust for navigation of the grid and maintaining lateral tension in the forward periphery of the grid;
   at least two reaction boats connected to opposite extents of an aft periphery of the grid, each of the reaction boats incorporating a sail and keel with an adjustable angle therebetween for aerodynamic and hydrodynamic shear force resolution for propulsive thrust for maintaining lateral tension in the aft periphery of the grid and reacting in concert with the tow boats to maintain longitudinal tension in the grid, said tow boats and reaction boats including a buoyancy system for repeatedly submerging and surfacing the support grid in a first surfaced position for sunlight exposure of the plants and a second submerged position at a depth for a nutrient rich layer above the bottom for nutrient gathering by the plants;

navigation and control electronics for directing the at least one support grid in the open ocean in a predetermined route, and, a harvesting station positionable at a predetermined point in the predetermined route for interacting with the plant support grid.

* * * * *